(12) United States Patent
Kuninaka

(10) Patent No.: US 7,641,150 B2
(45) Date of Patent: Jan. 5, 2010

(54) SOLID PROPELLANT-BASED SPACE PROPULSION DEVICE

(75) Inventor: Hitoshi Kuninaka, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 565 days.

(21) Appl. No.: 11/435,521

(22) Filed: May 16, 2006

(65) Prior Publication Data

US 2007/0075190 A1 Apr. 5, 2007

(30) Foreign Application Priority Data

May 17, 2005 (JP) ............................. 2005-144489

(51) Int. Cl.
*B64G 1/40* (2006.01)
(52) U.S. Cl. ................................. 244/171.2; 244/171.1
(58) Field of Classification Search ............. 244/171.1, 244/171.2, 169, 172.2, 62; 60/203.1, 202, 60/204; 219/121.6
See application file for complete search history.

(56) References Cited

U.S. PATENT DOCUMENTS

| | | | | |
|---|---|---|---|---|
| 3,392,527 | A | * | 7/1968 | Gilmour, Jr. et al. .......... 60/202 |
| 3,825,211 | A | * | 7/1974 | Minovitch ................ 244/171.1 |
| 4,036,012 | A | * | 7/1977 | Monsler ..................... 60/203.1 |
| 4,142,088 | A | * | 2/1979 | Hirsch ...................... 219/121.6 |
| 5,845,880 | A | * | 12/1998 | Petrosov et al. ............. 244/169 |

(Continued)

OTHER PUBLICATIONS

Tanaka, Shuji, et al. "MEMS-based Solid Propellant Rocket Array Thruster," ISTS 2002-a-02, Proceedings of the Twenty-Third International Symposium on Space Technology and Science, Matsue 2002, pp. 6-11, vol. I.

(Continued)

*Primary Examiner*—Tien Dinh
(74) *Attorney, Agent, or Firm*—Blakely, Sokoloff, Taylor & Zafman LLP

(57) ABSTRACT

Disclosed is a space propulsion device capable of continuous operation using a solid propellant having high density and excellent handleability. The solid propellant-based space propulsion device comprises solid-propellant support means for supporting a solid propellant, a solid-propellant attachment surface for permitting the solid propellant to be attached thereon, solid-propellant feed means for feeding the solid propellant to an attachment position on the solid-propellant attachment surface, adhesion-energy supply means for heatingly melting or sublimating the solid propellant in the attachment position to adherently attach the solid propellant onto the solid-propellant attachment surface, solid-propellant transfer means for transferring the solid propellant to a release position for releasing the solid propellant, and propulsive-energy supply means for energizing the transferred solid propellant to release the solid propellant from the solid-propellant attachment surface at the release position, as a propulsive jet, while accelerating the solid propellant in a direction approximately perpendicular to the solid-propellant attachment surface. The solid-propellant transfer means is designed to move the solid-propellant attachment surface in such a manner that a area of the solid-propellant attachment surface for adherently holding the solid propellant is returned to a position adjacent to an end of the solid propellant in a repetitive manner.

7 Claims, 5 Drawing Sheets

U.S. PATENT DOCUMENTS 5,924,278 A * 7/1999 Burton et al. ............ 60/203.1
6,530,212 B1 * 3/2003 Phipps et al. ............ 60/203.1
2003/0033797 A1   2/2003 Spanjers et al.

OTHER PUBLICATIONS

Kamhawi, Hani, et al. "High Thrust-to-Power Rectangular pulsed plasma thruster," AIAA/ASME/SAE/ASEE, Jul. 2002, AIAA 2002-3975, Joint Propulsion Conference and Exhibit, Indianapolis, Indiana, pp. 1-14.

Kakami, Akira, et al. "Performance study on liquid propellant pulsed plasma thruster," AIAA, Jul. 2003, AIAA 2003-5021, Joint Propulsion Conference, Huntsville, Alabama, pp. 1-8.

Kawakami, Masatoshi, et al. "Plasma behaviors in a laser-assisted plasma thruster," AIAA, Jul. 2003, AIAA 2003-5021, Joint Propulsion Conference, Huntsville, Alabama, pp. 1-9.

* cited by examiner

SOLID PROPELLANT-BASED SPACE PROPULSION DEVICE

CROSS-REFERENCE TO OTHER APPLICATIONS

The present patent application claims priority from Japanese Patent Application No. 2005-144489, filed on May 17, 2005.

TECHNICAL FIELD

The present invention relates to a space propulsion device, and more specifically to a solid propellant-based space propulsion device using a solid propellant in such a manner as to be supplied on a portion-by-portion basis.

BACKGROUND ART

Heretofore, fuels or propellants in gaseous, liquid and solid forms have been used for space propulsion units. In a general way, a gaseous propellant is highly pressurized and stored in a highly dense state, because the gaseous propellant under natural conditions requires a relatively large container volume. Thus, a storage container (tank) and associated components, such as pipes and valves, are essentially designed to have sufficient pressure resistance and structural strength to withstand such a high pressure. This causes a problem about increase in weight. Moreover, the high pressure is highly likely to cause failures, such as gas leakage from the valve or locking of the valve. A liquid propellant needs to use a high-pressure transfer system even though it originally has a high density, and therefore involves the same problem as that in the gaseous propellant. Further, a thruster using a high-pressure system has a problem about the need for performing a propellant-charging operation as a hazardous job before launch. A solid propellant originally has a high density, and exhibits excellent storage performance without the need for a high-pressure system. On the other hand, the solid propellant has a problem that, once ignited, a propulsive action cannot be stopped until being completely consumed, and a thrust cannot be on/off-controlled (interruption and restart of a thrusting operation) or adjusted. An explosive serving as the solid fuel is a flammable material subject to a fire ban in handling, and therefore has poor handleability on the ground. With a view to improving such disadvantages of the solid fuel, there have been made researches on a technique for storing a solid fuel in the form of a plurality of pieces divided on the basis of a volume required for each combustion, and igniting each of the pieces according to need (see, for example, the following Non-Patent Publication 1). However, this technique has a disadvantage that the sold fuel occupies a relatively large area depending on a required number of combustions.

A small-size thruster having difficulty in obtaining a high specific thrust (or specific impulse) needs a larger volume of propellant to generate a required ΔV. A weight of a section for storing a propellant is apt to increase in proportion to a volume of the propellant. Thus, it is important for a small-size thruster to reduce a dry weight of thruster components other than a fuel. In view of the above technical background, there has been proposed a device designed to emit a laser beam onto a solid propellant applied on a surface of a film so as to generate an ablation jet (see, for example, the following Patent Publication 1). A technique of emitting a laser beam from a back surface of the film as disclosed in the Patent Publication 1 can prevent a body and optics system of a laser device from being contaminated by jet substances, and has a certain level of effectiveness in this point. On the other hand, this device has a disadvantage of causing an increase in dry weight of a propulsion unit, because a weight of the film will increase in proportion to a volume of the propellant, and the increased weight of the film will be included in a weight of the propellant storage section despite of no contribution to thrust.

In the device disclosed in the Patent Publication 1, no nozzle is used for ablation jets, and therefore it is difficult to effectively generate a thrust. Moreover, a vaporized propellant is likely to spread and re-solidify, resulting in causing contamination of surroundings. In a space satellite designed to accurately adjust infrared characteristics on a surface thereof so as to control a temperature of the surface, a surface contamination causes serious evils. Thus, the above phenomenon is a critical problem.

As a solid propellant-based propulsion device utilizing no chemical reaction, there has been known one type, so-called "pulsed plasma thruster (PPT)" (see, for example, the following Patent Publication 2). While various materials have been tried as a solid propellant, PTFE (Polytetrafluoroethylene (Teflon®)) is commonly used (see, for example, the following Non-Patent Publication 2). This thruster has a disadvantage that a specific thrust cannot be desirably improved due to sublimated gas to be generated with a delay after completion of a pulsed discharge. Thus, a propellant is limited to a specific type having a low level of delayed gas generation. As other technological developments, efforts have been made for a technique of using a liquid propellant (see, for example, the following Non-Patent Publication 3), and a technique of controlling a sublimation quantity based on laser ablation (see, for example, the following Non-Patent Publication 4).

[Patent Publication 1] U.S. Pat. No. 6,530,212

[Patent Publication 2] U.S. Patent Application Publication No. 2003/0,033,797

[Non-Patent Publication 1] S. Tanaka, R. Hosokawa, S. Tokudome, K. Hori, H. Saito, M. Watanabe and M. Esaka, "MEMS-based Solid Propellant Rocket Array Thruster", ISTS 2002-a-02, Proceedings of the 23 International Symposium on Space Technology and Science, Matsue, 2002, pp. 6-11.

[Non-Patent Publication 2] H. Kamhawi, E. Pencil and T. Haag, "High Thrust-to-Power Rectangular Pulsed Plasma Thruster", AIAA 2002-3975, Join Propulsion Conference, Indianapolis, Jul. 2002.

[Non-Patent Publication 3] A. Kakami, H. Koizumi and K. Komusasaki, "Performance Study on Liquid Propellant Pulsed Plasma Thruster", AIAA 2003-5021, Joint Propulsion Conference, Huntsville, Jul. 2003.

[Non-Patent Publication 4] M. Kawakami, W. Lin, A. Igari, H. Horisawa and I. Kimura, "Plasma Behaviors in a Laser-Assisted Plasma Thruster", AIAA 2003-5028, Joint Propulsion Conference, Huntsville, Jul. 2003.

DISCLOSURE OF THE INVENTION

As mentioned above, various attempts have been made for allowing solid propellants having a high density, no need for a high-pressure storage/transfer system, and high handleability, to be used in a space thruster propulsion device, all of the conventional techniques have disadvantages, such as an increase in weight of the propulsion device, a surface contamination and restrictions in improving a specific thrust, or have a bunch of problems. In view of the above problems, it is an object of the present invention to provide a solid propellant-based space propulsion device capable of supplying a solid propellant on a portion-by-portion basis.

The above object is achieved by the present invention having the following features. Specifically, the present invention provides a solid propellant-based space propulsion device which comprises: solid-propellant support means for supporting a solid propellant; a solid-propellant attachment surface for permitting the solid propellant supported by the solid-propellant support means to be attached thereon on a portion-by-portion basis from the side of an end of the solid propellant; solid-propellant feed means for moving the solid propellant supported by the solid-propellant support means toward the solid-propellant attachment surface to feed the solid propellant to an attachment position for attaching the solid-propellant onto the solid-propellant attachment surface; adhesion-energy supply means for heatingly melting or sublimating a portion of the solid propellant fed to be in contact with or adjacent to the attachment position on the solid-propellant attachment surface, so as to adherently attach the portion of the solid propellant onto the solid-propellant attachment surface; solid-propellant transfer means for moving the solid-propellant attachment surface having a area for adherently holding the solid propellant thereon, to transfer the solid propellant adherently held on the area to a release position for releasing the solid propellant; and propulsive-energy supply means for energizing the solid propellant transferred to the release position to release the solid propellant from the solid-propellant attachment surface, toward a downstream side thereof as a propulsive jet, while accelerating the solid propellant in a direction approximately perpendicular to the solid-propellant attachment surface at the release position. The solid-propellant transfer means is designed to move the solid-propellant attachment surface in such a manner that the area for adherently holding the solid propellant is returned to a position adjacent to the end of the solid propellant in a repetitive manner.

In the invention, the solid propellant-based space propulsion device further comprises a tube-shaped jet member having an upstream end for introducing the propulsive jet generated at the release position and a downstream end for expelling the introduced propulsive jet. The upstream end of the jet member is disposed adjacent to the solid-propellant attachment surface. In this case, the release position is defined within a area of the solid-propellant attachment surface surrounded by the upstream end of the jet member.

In the invention, the jet member is formed as a divergent nozzle.

In the invention, the solid propellant is formed in a rod shape, and the solid-propellant feed means is operable to linearly move the solid propellant toward the solid-propellant attachment surface so as to feed the solid propellant forward.

In the invention, the solid-propellant feed means comprises a spring adapted to bias the solid propellant toward the solid-propellant attachment surface so as to feed the solid propellant forward.

In the invention, at least a part of the solid-propellant attachment surface is formed as a transparent portion made of a transparent material, and the adhesion-energy supply means is composed of a laser beam oscillator. The laser beam oscillator is designed to generate a laser beam and irradiate the solid propellant located at the attachment position, with the laser beam from behind the solid-propellant attachment surface through the transparent portion to heatingly melt or sublimate the solid propellant so as to adherently attach the solid propellant onto the solid-propellant attachment surface.

In the invention, the solid propellant is made of a material which is sublimatable by heating, and at least a part of the solid-propellant attachment surface is formed as a transparent portion made of a transparent material. Further, the propulsive-energy supply means is composed of a laser beam oscillator. The laser beam oscillator is designed to generate a laser beam and irradiate the powder propellant transferred to the release position, with the laser beam from behind the solid-propellant attachment surface through the transparent portion to heatingly sublimate and release the powder propellant.

In the invention, the solid propellant is made of a material which is sublimatable by heating, and the propulsive-energy supply means is composed of a pair of main-discharge electrodes disposed inside the jet member and in opposed relation to one another, and a main-discharge power supply. The main-discharge power supply is designed to generate a high voltage and apply the high voltage between the main-discharge electrodes so as to produce a main discharge to heatingly sublimate and release the solid propellant located adjacent to the main-discharge electrodes.

In the invention, the solid propellant-based space propulsion device further comprises: an igniter including a triggering-discharge electrode designed to produce a triggering discharge for initiating a main discharge between the main-discharge electrodes and disposed inside the jet member and in adjacent relation to the solid-propellant attachment surface; and a triggering-discharge power supply for the triggering discharge. In this case, the main-discharge electrodes are composed of a pair of rod-shaped electrodes disposed in opposed relation to one another in a divergent arrangement. The igniter is operable to produce the triggering discharge so as to generate the main discharge between the main-discharge electrodes, and the main-discharge electrodes are operable to sublimate the solid propellant by the main discharge generated therebetween while ionizing at least a part of the sublimated solid propellant, and allow the ionized solid propellant to be expelled toward the downstream side of the jet member based on an electromagnetic interaction between a current supplied to the ionized solid propellant by the main discharge and a magnetic field generated by the main discharge.

In the invention, the main-discharge electrodes constitute at least a part of the jet member.

In the invention, the solid-propellant attachment surface is formed in a cylindrical shape, and the solid-propellant transfer means is designed to rotate the solid-propellant attachment surface about an axis of the cylindrical shape so as to transfer the solid propellant to the release position.

In the invention, the solid-propellant attachment surface is formed in a partially-cylindrical shape having a sector-shaped bottom, and the solid-propellant transfer means is designed to swing the solid-propellant attachment surface about an axis of the partially-cylindrical shape so as to transfer the solid propellant to the release position.

In the invention, the solid-propellant attachment surface is formed in a planar shape, and the solid-propellant transfer means is designed to linearly reciprocate the solid-propellant attachment surface so as to transfer the solid propellant to the release position.

In the invention, the solid propellant is made of a material which is sublimatable by heating, and the solid-propellant attachment surface is formed in a cylindrical shape or in a partially-cylindrical shape having a sector-shaped bottom. At least a part of the solid-propellant attachment surface is formed as a transparent portion made of a transparent material. Further, the propulsive-energy supply means is composed of a plurality of laser beam oscillators each designed to irradiate a corresponding one of a plurality of different positions of the solid-propellant attachment surface with a laser beam. In this case, plural number of the release positions are defined, respectively, at the plurality of different positions to be irradiated with the laser beam, and each of the laser beam oscillators serving as the propulsive-energy supply means is designed to generate a laser beam, and irradiate the solid propellant transferred to a corresponding one of the release positions, with the laser beam from behind the solid-propellant attachment surface through the transparent portion so as to heatingly sublimate and release the solid propellant.

In the invention, the solid propellant is made of a material which is sublimatable by heating, and the solid-propellant attachment surface is formed in a cylindrical shape or in a partially-cylindrical shape having a sector-shaped bottom. At least a part of the solid-propellant attachment surface is formed as a transparent portion made of a transparent material. Further, the propulsive-energy supply means is composed of a laser beam oscillator including laser-beam emitting direction changing means operable to change an emitting direction of a laser beam. In this case, the release position is defined in a given range corresponding to a area of the solid-propellant attachment surface to be irradiated with the laser beam, and the laser beam oscillator serving as the propulsive-energy supply means is designed to generate a laser beam, and irradiate the solid propellant transferred to the release position defined in the range, with the laser beam from behind the solid-propellant attachment surface through the transparent portion so as to heatingly sublimate and release the solid propellant.

The present invention allows a solid propellant having high density and excellent handleability to be supplied on a portion-by-portion basis while managing an amount of consumption of the solid propellant, and released/expelled as a propulsive jet. Thus, the present invention can provide an effect of being able to achieve enhanced fuel economy (higher specific thrust) in a space propulsion device. In addition, the present invention makes it possible to interrupt and restart a thrusting operation in a solid propellant-based propulsion device, which has not been able to be achieved by the conventional techniques.

BEST MODE FOR CARRYING OUT THE INVENTION

With reference to the drawings, a solid propellant-based space propulsion device according to an embodiment of the present invention will now be described. In a solid propellant-based space propulsion device of the present invention, a solid propellant stored in a container is attached onto an attachment surface and transferred while being adherently held on the attachment surface. Then, the transferred solid propellant is energized and released to obtain a propulsive jet. The attachment to the attachment surface for the purpose of transferring the solid propellant is implemented by means of heating/melting or heating/sublimation based on a laser beam (laser heating). The release of the solid propellant is implemented by means of: heating/sublimation based on a laser beam and acceleration based on resulting increased pressure (laser heating); heating/sublimation based on electric discharge and acceleration based on resulting increased pressure (discharge heating); and formation of a plasma based on electric discharge and electromagnetic acceleration [PPT (Pulsed Plasma Thruster) electromagnetic acceleration]. The present invention will be described in connection with the following representative embodiments thereof which are different in solid-propellant release mechanism: a first embodiment (laser heating); a second embodiment (PPT electromagnetic acceleration); and a third embodiment (discharge heating).

In the laser heating, a area to be irradiated with a laser beam may be changed to vary a direction of a propulsive jet, by switching between a plurality of laser devices or by varying a laser beam emitting direction. As a specific embodiment designed to vary a direction of a propulsive jet in the combination of laser heating as the solid-propellant release mechanism, a fourth embodiment (switching between a plurality of laser devices) and a fifth embodiment (variable laser beam emitting direction) will be described.

First Embodiment

Laser Heating

Figure 1:
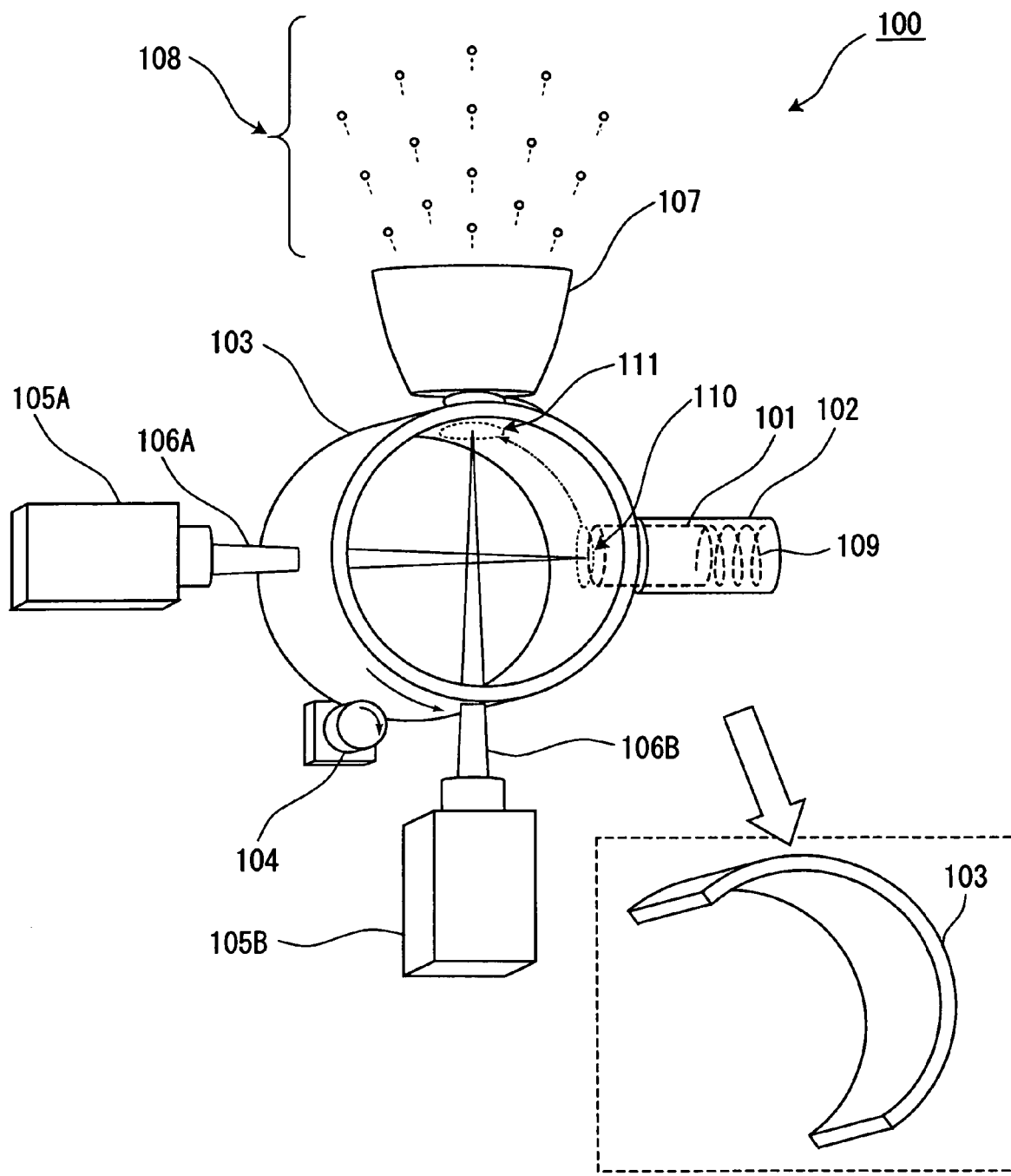
FIG. 1 is a schematic perspective view showing the structure of a solid propellant-based space propulsion device 100 according to a first embodiment of the present invention.

A first embodiment of the present invention will be described below. FIG. 1 is a schematic perspective view showing the structure of a solid propellant-based space propulsion device 100 according to the first embodiment of the present invention. In the solid propellant-based space propulsion device 100, a solid propellant is released by means of laser heating. The structure of the solid propellant-based space propulsion device 100 will be firstly described. The solid propellant-based space propulsion device 100 comprises a solid-propellant support case 102, a solid-propellant attachment drum 103, a solid-propellant-attachment-drum rotating motor 104, an adhesion-inducing laser beam oscillator 105A, a release-inducing laser beam oscillator 105B, a nozzle 107 and a solid-propellant feed spring 109. The solid propellant-based space propulsion device 100 also includes a housing (not shown) containing the above components while adequately maintaining a positional relationship therebetween. The solid propellant-based space propulsion device 100 further includes a controller (not shown) 112 for controlling respective operations of the solid-propellant-attachment-drum rotating motor 104, the adhesion-inducing laser beam oscillator 105A and the release-inducing laser beam oscillator 105B in association with each other. In the solid propellant-based space propulsion device 100, a solid propellant 101 is used as a propellant.

The solid propellant 101 is made of a material which is sublimatable by heating based on energization thereof. When the thermally sublimated material is released/expelled from the solid propellant-based space propulsion device 100, it can produce a thrust for the space propulsion device 100. More specifically, the solid propellant 101 is made of a material which is heatingly molten or sublimated by energy (adhesion energy) less than propulsive-energy required for releasing/expelling the solid propellant 101. Thus, the adhesion energy can be given to the solid propellant 101 to allow the solid propellant 101 to be attached onto and adherently held on the solid-propellant attachment drum 103. The solid propellant 101 is a solid body which has the features of solid, such as high density, high storage efficiency, excellent handleability/storageability on the ground and no need for a high-pressure system in transfer. Preferably, the solid propellant 101 is formed in a stick or rod shape. While the solid propellant 101 is preferably formed as a single solid body, it may be a plurality of divided solid bodies. The solid propellant-based space propulsion device 100 is operated in a substantially vacuum-pressure environment, and therefore the solid propellant 101 may be made of a material which is sublimatable by heating in a substantially vacuum-pressure environment. When the solid propellant 101 is applied with energy or energized, it will be sublimated and transformed into high-temperature/high-pressure gas. The high-temperature/high-pressure gas is accelerated by its own pressure, and released/expelled as a propulsive jet 108. A thrust is produced by a reaction force against the propulsive jet 108. This thrust producing process is referred to as "laser ablation".

During a transfer process, the solid propellant 101 is held on the solid-propellant attachment drum 103 by an intermolecular attractive force between two materials in close contact with one another, such as an adherence (adherent force) or adhesive force. The solid propellant 101 is molten and liquefied by the adhesion energy. Then, the liquefied propellant is brought into contact with the solid-propellant attachment drum 103 having a lower temperature, and solidified and attached on the solid-propellant attachment drum 103. Alternatively, the solid propellant 101 is sublimated or transformed from solid to gas, by the adhesion energy. Then, the gaseous propellant is brought into contact with the solid-propellant attachment drum 103 having a lower temperature, and solidified and attached on the solid-propellant attachment drum 103.

The material of the solid propellant 101 is not limited to PTFE (Teflon®) which has heretofore been used as a material of propellants, but may be selected from a wide range of materials. Specifically, the solid propellant 101 may be made of any suitable material capable of being gasified without difficulty, such as polypropylene, polyethylene or vinyl chloride.

The solid-propellant support case 102 is provided as one specific example of solid-propellant support means having a mechanism for supporting a propellant or the solid propellant 101. The solid-propellant support case 102 serves as means for supporting the solid propellant 101 in a storing manner, and positioning the solid propellant 102 in such a manner that an end thereof is brought into contact with an attachment position 110 for attaching the solid propellant 102 onto the solid-propellant attachment drum 103 (the end will hereinafter be referred to as "first end"). In the embodiment illustrated in FIG. 1, the solid-propellant support case 102 has a cylindrical shape capable of containing a rod-shaped solid propellant 101. As long as the solid-propellant support case 102 can position the solid propellant 101 relative to a surface of the solid-propellant attachment drum 103, it is not essential to contain substantially the entire solid propellant 101. Preferably, the solid-propellant support case 102 is designed such that an edge thereof on the side of the solid-propellant attachment drum 103 extends to a position adjacent to the solid-propellant attachment drum 103 to cover the attachment position 110, so as to prevent the solid propellant 101 from scattering over surroundings during attachment to the solid-propellant attachment drum 103. In this case, the edge of the solid-propellant support case 102 on the side of the solid-propellant attachment drum 103 is preferably formed to extend from the attachment position in a rotation direction of the solid-propellant attachment drum 103 while increasing a clearance relative to the solid-propellant attachment drum 103, so that the solid propellant 101 attached on the solid-propellant attachment drum 103 can be transferred without interference with the edge of the solid-propellant support case 102. When the solid-propellant feed spring 109 is designed to position the solid propellant 101 in a direction perpendicular to the surface of the solid-propellant attachment drum 103, the solid-propellant support case 102 is designed to position the solid propellant 101 in a horizontal direction relative to the surface of the solid-propellant attachment drum 103.

The solid-propellant attachment drum 103 is provided as one specific example of a solid-propellant attachment surface for permitting the solid propellant 101 to be attached thereon. The solid-propellant attachment drum 103 is disposed in adjacent relation to or in contact with the first end of the solid propellant 101 supported by the solid-propellant support case 102, and the molten or sublimated solid propellant 101 is allowed to be attached onto and adherently held on the surface thereof The attachment position 110 is a positional zone determined by a positional relationship between the solid-propellant attachment drum 103 and other component, such as the solid-propellant support case 102, and the attachment position 110 is equivalent to a certain range of a cross-sectional area of the solid propellant 101 in contact with the surface of the solid-propellant attachment drum 103. While the attachment position 110 has a circular shape in FIG. 1, it may be any other shape suitable for the cross-sectional shape of the solid propellant 101. Preferably, the solid-propellant attachment drum 103 has a cylindrical shape. Preferably, the solid-propellant attachment drum 103 is formed as a cylindrical-shaped drum made of a material transparent to an after-mentioned adhesion-inducing laser beam 106A and release-inducing laser beam 106B. The solid-propellant attachment drum 103 made of such a transparent material is hardly heated at all by the adhesion-inducing laser beam 106A, and maintained at a low temperature even after the adhesion-inducing laser beam 106A is emitted onto the solid propellant 101 therethrough. Thus, the solid propellant 101 molted or sublimated by the adhesion-inducing laser beam 106A can be cooled and solidified by the surface of the solid-propellant attachment drum 103 to attach the solid propellant 101 onto the surface. While the solid-propellant attachment drum 103 in this embodiment has a hollow structure, it may be formed in a solid structure.

Instead of a perfect cylindrical shape, the surface of the solid-propellant attachment drum 103 for adherently holding the solid propellant 101 may have a partially-cylindrical shape (partially-circular cylinder-like shape or armor-like shape) having a sector-shaped bottom. The area surrounded by the dashed box in FIG. 1 shows one example of the solid-propellant attachment drum 103 having a partially-cylindrical shape. The shape of the solid-propellant attachment drum 103 is not limited to a cylindrical shape, but may be formed in any suitable shape other than a drum shape, such as a different curved shape or a planar shape (one example of modification using a solid-propellant attachment drum having a shape other than a cylindrical shape).

The solid-propellant-attachment-drum rotating motor 104 is provided as one specific example of solid-propellant transfer means for rotationally move the solid-propellant attachment drum 103 serving as a solid-propellant attachment surface and having a area for adherently holding the solid propellant 101 thereon, according to control of the controller 112, to transfer the solid propellant 101 to a release position for releasing the solid propellant. The solid-propellant-attachment-drum rotating motor 104 may be integrated with the solid-propellant attachment drum 103. The solid-propellantattachment-drum rotating motor 104 is controlled in such a manner as to be rotated in a required number of rotations, at an adequate rotational speed and in an adequate rotational direction. The solid-propellant-attachment-drum rotating motor 104 is operable to switch between two opposite rotational directions of the solid-propellant attachment drum 103 when it has a partially-cylindrical shape, or to reciprocate the solid-propellant attachment drum 103 when it has a planar shape (one example of modification using a solid-propellant attachment drum having a shape other than a cylindrical shape).

The solid-propellant-attachment-drum rotating motor 104 is also operable to move the solid-propellant attachment drum 103 serving as a solid-propellant attachment surface in such a manner that the area for adherently holding the solid propellant 101 (hereinafter referred to as "solid-propellant holding area") in the solid-propellant attachment drum 103 is returned to the attachment position 110 adjacent to the first end of the solid propellant supported by the solid-propellant support case 102 in a repetitive manner. Thus, the solid-propellant attachment surface which adherently held the solid propellant once can be repeatedly used as a solid-propellant attachment surface. This makes it possible to reduce an area of the solid-propellant attachment surface and reduce in size and weight of the solid propellant-based space propulsion device 100.

The solid-propellant-attachment-drum rotating motor 104 may be designed to rotate the solid-propellant attachment drum 103 in one direction, or may be designed to rotate the solid-propellant attachment drum 103 alternately in opposite directions. Specifically, when the solid-propellant attachment drum 103 having a surface for adherently holding the solid propellant 101 is formed in a partially-cylindrical shape having a sector-shaped bottom, the solid-propellant-attachment-drum rotating motor 104 may be designed to swingably rotate the solid-propellant attachment drum 103 about an axis of the partially-cylindrical shape alternately in opposite directions. Further, when the solid-propellant attachment drum 103 having a surface for attracting and adherently holding the solid propellant 101 is formed in a planar shape, the solid-propellant-attachment-drum rotating motor 104 may be designed to linearly reciprocate the solid-propellant attachment drum 103 (one example of modification using a solid-propellant attachment drum having a shape other than a cylindrical shape).

The adhesion-inducing laser beam oscillator 105A is provided as one specific example of adhesion-energy supply means for giving adhesion energy to a first end of the solid propellant 101 in the attachment position 110 to heatingly melt or sublimate an end of the solid propellant 101 so as to attach the solid propellant 101 onto a surface of the solid-propellant attachment drum 103. The adhesion-inducing laser beam oscillator 105A is disposed at a position capable of emitting an adhesion-inducing laser beam 106A onto a rear surface of the solid-propellant holding area of the solid-propellant attachment drum 103 at the attachment position 110. Preferably, the adhesion-inducing laser beam oscillator 105A is disposed on the opposite side of the attachment position 110 with respect to the solid-propellant attachment drum 103 in such a manner that an optical axis of the adhesion-inducing laser beam 106A to be oscillated by and emitted from the adhesion-inducing laser beam oscillator 105A is aimed at the attachment position 110. The adhesion-inducing laser beam oscillator 105A is operable to oscillate the adhesion-inducing laser beam 106A and emit the oscillated adhesion-inducing laser beam 106A to the first end of the solid propellant 101 located close to the solid-propellant attachment drum 103 at the attachment position 110, so as to heat the first end of the solid propellant 101. The adhesion-inducing laser beam oscillator 105A may include a lens disposed on a downstream side of a position for emitting the adhesion-inducing laser beam 106A to focus the oscillated laser beam so as to concentrate energy at a specific position in the attachment position.

The release-inducing laser beam oscillator 105B is provided as one specific example of propulsive-energy supply means for giving propulsive energy the solid propellant 101 transferred to the release position 111 to accelerate and release the solid propellant 101 as a propulsive jet. The release-inducing laser beam oscillator 105B is disposed at a position capable of emitting a release-inducing laser beam 106B onto a rear surface of the solid-propellant holding area of the solid-propellant attachment drum 103 at the release position 111. Preferably, the release-inducing laser beam oscillator 105B is disposed on the opposite side of the release position 111 with respect to the solid-propellant attachment drum 103 in such a manner that an optical axis of the release-inducing laser beam 106B to be oscillated by and emitted from the release-inducing laser beam oscillator 105B is aimed at the release position. This arrangement where the release-inducing laser beam oscillator 105B is disposed on the opposite side of the release position 111 can prevent the release-inducing laser beam oscillator 105B from being contaminated by the sublimated solid propellant 101. The release-inducing laser beam oscillator 105B is operable to oscillate the release-inducing laser beam 106B, and irradiate/heat the solid propellant 101 transferred to the release position 111 with the release-inducing laser beam 106B. The release-inducing laser beam oscillator 105B may include a lens disposed on a downstream side of a position for emitting the release-inducing laser beam 106B to focus the oscillated laser beam so as to concentrate energy at a specific position at the release position. The release position 111 has no component blocking the expelling of the solid propellant 101. The release position 111 is a positional zone determined by a positional relationship between the solid-propellant attachment drum 103 and other component, such as the solid-propellant support case 102. While the release position 111 has a circular shape in FIG. 1, it may be any other suitable shape, such as an elongated shape.

The nozzle 107 is provided as one specific example of a jet member for guiding the solid propellant 101 sublimated into high-pressure gas, or the propulsive jet 108, to the outside, in such a manner as to introduce the propulsive jet 108 through an upstream end thereof and expel the propulsive jet 108 from a downstream end thereof. Preferably, the nozzle 107 is formed in a divergent tube shape. The nozzle 107 has two openings consisting of a narrow opening formed at an upstream end thereof (upstream open end), and a wide opening formed at a downstream end thereof (downstream open end). The upstream open end of the nozzle 107 is disposed adjacent to the release position 111 in a surrounding manner. As used in this specification, the term "opening direction" of the nozzle 107 means a direction extending from the center of the upstream open end to the center of the downstream open end. The solid propellant 101 is released and expelled in the opening direction as the propulsion jet 108. The nozzle 107 is disposed in such a manner that the opening direction is aligned with a direction allowing the solid propellant 101 sublimated into high-pressure gas to be accelerated while receiving the largest force. This direction corresponds to a direction perpendicular to the surface of the solid-propellant attachment drum 103 at the release position 111 where the solid propellant 101 is sublimated into high-pressure gas. The nozzle 107 serves as a shield for preventing the sublimated solid propellant 101 from spreading over surroundings and attaching on surrounding devices/structures as a re-solidified substance causing contamination thereof, and as means for adequately controlling a direction and speed of the propulsive jet 108 to efficiently obtain a thrust.

The solid-propellant feed spring 109 is provided as one specific example of solid-propellant feed means for moving the solid propellant 101 supported by the solid-propellant support case 102 to feed the solid propellant 101 to the attachment position 110 for attaching the solid propellant 101 onto the solid-propellant attachment drum 103. The solid-propellant feed spring 109 is operable to linearly move the solid propellant 101 toward the solid-propellant attachment drum 103 by means of a restoring force thereof so as to feed the solid propellant 101 forward. The solid-propellant feed spring 109 is formed as a helical spring. The solid-propellant feed spring 109 may have one end which is brought in contact with the other end (second end) of the solid propellant 101 on the opposite side of the first end located close to the solid-propellant attachment drum 103, in such a manner as to bias the solid propellant 101 toward the solid-propellant attachment drum 103 and to position the solid propellant 101 in a direction perpendicular to the surface of the solid-propellant attachment drum 103. The solid-propellant feed means is not limited to the specific mechanism designed to linearly feed the solid propellant 101, but may be designed to feed the solid propellant 101 along a circular arc path, or to transport the solid propellant 101 from a remote storage location to a position opposed to the attachment position 110 on the solid-propellant attachment drum 103 and then feed the solid propellant 101 toward the solid-propellant attachment drum 103.

As one example of modification of the solid-propellant feed spring 109 serving as the solid-propellant feed means, a driving mechanism, such as a linear actuator adapted to feed the solid propellant 101 toward the solid-propellant attachment drum 103, may be used. In this case, a spring may be interposed between the linear actuator and the solid propellant 101 to smoothen a force to be applied from the linear actuator to the solid propellant 101.

The controller 112 consists of a control circuit which is operable to activate the adhesion-inducing laser beam oscillator 105A so as to attach the solid propellant 101 onto the solid-propellant attachment drum 103, and then adequately operate the solid-propellant-attachment-drum rotating motor 104 so as to transfer the solid propellant 101 adherently held on the solid-propellant attachment drum 103 toward the release position 111. Further, the control circuit is operable, when the solid propellant 101 reaches the release position, to instruct the release-inducing laser beam oscillator 105B to oscillate and emit the release-inducing laser beam 106B while controlling the release-inducing laser beam oscillator 105B in such a manner as allow the release-inducing laser beam 106B to be adequately emitted onto the solid propellant 101. The controller 112 is designed to receive an output of a sensor or the like so as to detect a position of the solid propellant 101 on the solid-propellant attachment drum 103, and instruct the release-inducing laser beam oscillator 105B based on the detected position to emit the release-inducing laser beam 106B to the solid propellant 101.

An operation of the solid propellant-based space propulsion device 100 will be described below. The solid propellant 101 is fed toward the solid-propellant attachment drum 103 by a biasing force of the solid-propellant feed spring 109 having one end in contact with the second end of the solid propellant 101, while being supported by the solid-propellant support case 102. In response to receiving a command to expel the propulsive jet 108, from a satellite attitude control computer or the like, the controller 112 instructs the adhesion-inducing laser beam oscillator 105A to oscillate and emit the adhesion-inducing laser beam 106A so as to irradiate the first end of the solid propellant 101 at the attachment position 110 with the adhesion-inducing laser beam 106A from behind or a rear surface of the solid-propellant attachment drum 103 through the solid-propellant attachment drum 103. In the case where the solid propellant 101 is continuously or serially attached and transferred, the adhesion-inducing laser beam 106A is continuously or serially emitted. Preferably, the controller 112 is operable control not only the timing of the adhesion-inducing laser beam 106A to be oscillated by the adhesion-inducing laser beam oscillator 105A but also an intensity of the adhesion-inducing laser beam 106A so as to allow the solid propellant 101 to be attached on a portion-by-portion basis in a required volume.

The first end of the solid propellant 101 irradiated with the adhesion-inducing laser beam 106A is heatingly molten or sublimated. The molten or sublimated solid propellant 101 is cooled and solidified by the low-temperature surface of the solid-propellant attachment drum 103 with which the first end has been in contact, and attached onto and adherently held on the solid-propellant attachment drum 103.

Under control of the controller 112, the solid-propellant-attachment-drum rotating motor 104 rotates the solid-propellant attachment drum 103 according to the rotation thereof to transfer the area for adherently holding the solid propellant 101 (or the solid-propellant holding area) of the solid-propellant attachment drum 103 from the attachment position 110 to the release position 111 for releasing the solid propellant 101. Preferably, the solid propellant 101 is sequentially or serially attached and transferred. The controller 112 adequately controls the rotational speed of the solid-propellant attachment drum 103 to allow the solid propellant 101 to be attached and transferred on a portion-by-portion basis in a required volume.

The controller 112 detects that the solid propellant 101 has been transferred to the release position 111, based on an output of a sensor or the number of rotations of the solid-propellant-attachment-drum rotating motor 104, and instructs the release-inducing laser beam oscillator 105B to oscillate and emit the release-inducing laser beam 106B so as to allow the solid-propellant holding area of the solid-propellant attachment drum 103 transferred to the release position 111 to be irradiated with the release-inducing laser beam 106B from behind or the rear surface of the solid-propellant attachment drum 103 through the solid-propellant attachment drum 103. In the case where the solid propellant 101 is serially transferred, the release-inducing laser beam 106B is serially emitted in synchronization therewith. The solid propellant 101 irradiated with the release-inducing laser beam 106B absorbs energy of the release-inducing laser beam. Thus, the solid propellant 101 is heated and sublimated into a high-temperature/high-pressure gas. The resulting high-pressure gas exerts a pressure perpendicular to the surface of the solid-propellant attachment drum 103 at the release position 111, and receives the same level of perpendicular pressure from the surface as a counteraction against the exerted pressure. Thus, the high-pressure gas is accelerated in the direction perpendicular to the surface. Then, the accelerated high-pressure gas is guided by the nozzle 107 and expelled toward a downstream side in the opening direction of the nozzle 107 as the propulsive jet 108 so as to produce a thrust as a counteraction against the propulsive jet 108.

In this manner, the laser beam 106 can be emitted for a given time period to adequately control and manage a volume of the solid propellant 101 to be produced as the propulsive jet 108, so as to prevent a delay in sublimation of the solid propellant 101. This makes it possible to prevent deterioration in performance of the solid propellant-based space propulsion device 100, and to employ a wide range of materials for the solid propellant 101 without being limited to PTFE (Teflon®) so as to achieve further enhanced performance.

The controller 112 instructs the solid-propellant-attachment-drum rotating motor 104 to adequately rotate the solid-propellant attachment drum 103 in such a manner that the solid-propellant holding area of the solid-propellant attachment drum 103 after being irradiated with the release-inducing laser beam 106B is moved and returned to the attachment position 110 adjacent to the first end of the solid propellant 101 supported by the solid-propellant support case 102, in a repetitive manner. For example, the solid-propellant attachment drum 103 is rotated in one direction so as to allow the solid-propellant holding area of the solid-propellant attachment drum 103 after being irradiated with the release-inducing laser beam 106B to be returned to the attachment position 110 with respect to each 360-degree rotation in a repetitive manner. In the case where the solid-propellant attachment drum 103 has a partially-cylindrical shape, the rotational direction of the solid-propellant attachment drum 103 may be changed in the reverse direction so as to allow the solid-propellant holding area of the solid-propellant attachment drum 103 after being irradiated with the release-inducing laser beam 106B to be returned to the attachment position 110 with respect to each reciprocating movement in a repetitive manner (one example of modification using a solid-propellant attachment drum having a shape other than a cylindrical shape). When the solid-propellant attachment drum 103 is continuously rotated in one direction, the solid propellant 101 can be serially supplied and released/expelled. The controller 112 can control the rotational speed of the solid-propellant-attachment-drum rotating motor 104 so as to control a volume of the solid propellant 101 to be supplied.

Second Embodiment

PPT Electromagnetic Acceleration

Figure 2:
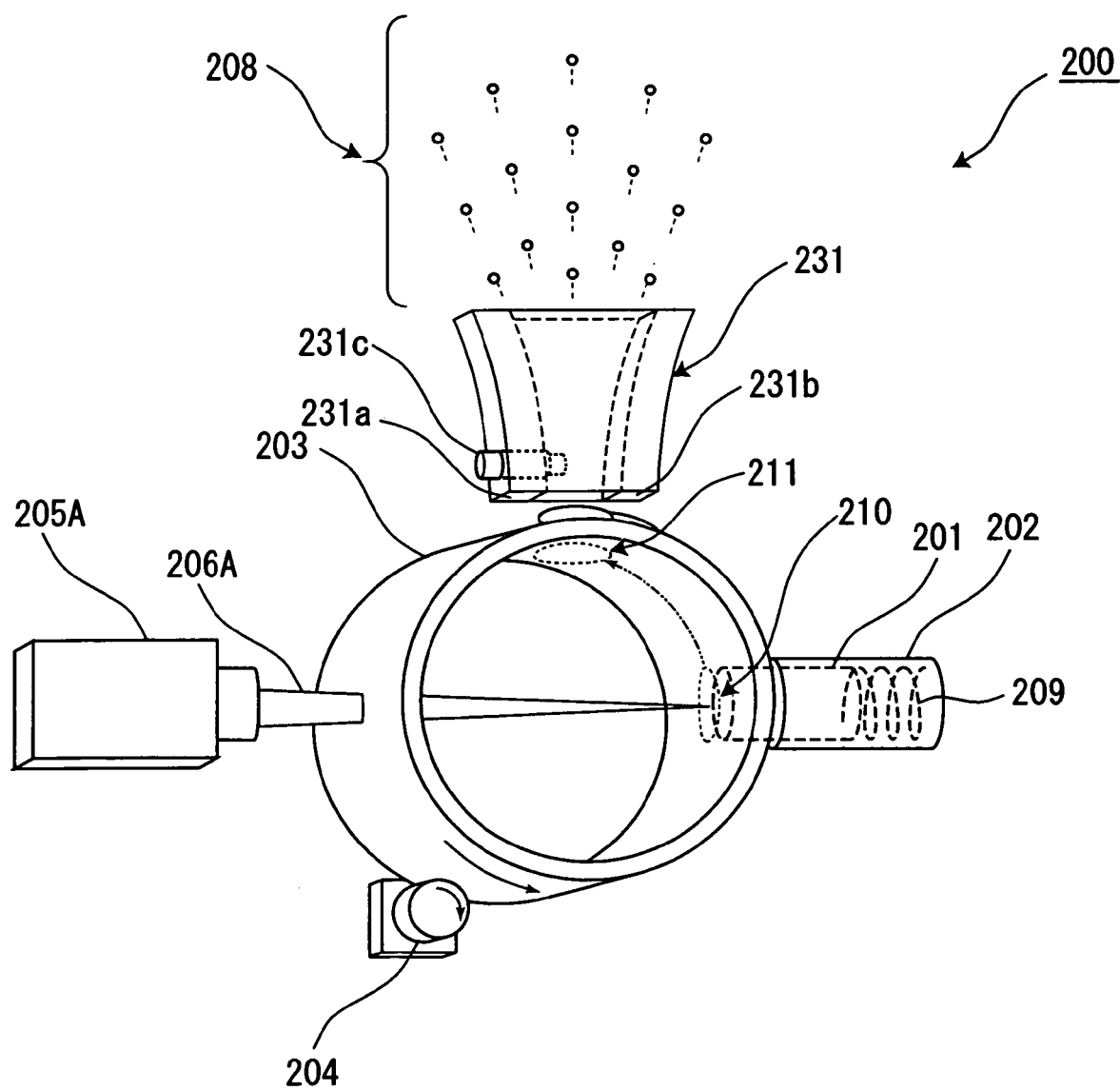
FIG. 2 is a schematic perspective view showing the structure of a solid propellant-based space propulsion device 200 according to a second embodiment of the present invention.

A second embodiment of the present invention will be described below. FIG. 2 is a schematic perspective view showing the structure of a solid propellant-based space propulsion device 200 according to the second embodiment of the present invention. In the solid propellant-based space propulsion device 200, a solid propellant is released by means of PPT electromagnetic acceleration.

The structure of the solid propellant-based space propulsion device 200 will be firstly described. In FIG. 2, a component equivalent to that in other embodiments is defined by a reference numeral having the common tens and ones digits. The solid propellant-based space propulsion device 200 comprises a solid-propellant support case 202, a solid-propellant attachment drum 203, a solid-propellant-attachment-drum rotating motor 204, an adhesion-inducing laser beam oscillator 205A, a solid-propellant feed spring 209 and a nozzle 231. The nozzle 231 includes a main-discharge electrode 231a, a main-discharge electrode 231b and an igniter 231c. The solid propellant-based space propulsion device 200 includes a housing (not shown) containing the above components while adequately maintaining a positional relationship therebetween. The solid propellant-based space propulsion device 200 further includes a controller (not shown) 212 for controlling respective operations of the solid-propellant-attachment-drum rotating motor 204, the adhesion-inducing laser beam oscillator 205A and the igniter 231c in association with each other. The solid propellant-based space propulsion device 200 is different from the solid propellant-based space propulsion device 100 according to the first embodiment, in that the solid propellant-based space propulsion device 200 includes the nozzle 231 as an additional component without using components equivalent to the release-inducing laser beam oscillator 105B and the nozzle 107 in the first embodiment. In the solid propellant-based space propulsion device 200, a solid propellant 201 is used as a propellant.

The solid propellant 201 is made of a material which is sublimatable and ionizable to produce a plasma, by electric discharge. When the sublimated material is released/expelled from the solid propellant-based space propulsion device 200, it can produce a thrust for the space propulsion device 200. More specifically, the solid propellant 201 is made of a material which is heatingly molten or sublimated by energy (adhesion energy) less than propulsive-energy required for releasing/expelling the solid propellant 201. Thus, the adhesion energy can be given to the solid propellant 201 to allow the solid propellant 201 to be attached onto and adherently held on the solid-propellant attachment drum 203.

Each of the solid-propellant support case 202, the solid-propellant attachment drum 203, the solid-propellant-attachment-drum rotating motor 204, the adhesion-inducing laser beam oscillator 205A, the solid-propellant feed spring 209 and the controller 212 has the same structure as the corresponding component in the first embodiment, except that the controller 212 is electrically connected to a triggering-discharge power supply of the igniter 231c.

The nozzle 231 is provided as one specific example of a combination of propulsive-energy supply means for supplying propulsive energy to the solid propellant 201, and a jet member for guiding a sublimated solid propellant 201 to the outside as a propulsive jet 208. Specifically, the nozzle 231 serving as the jet member is operable to adequately control a direction and speed of the propulsive jet 208 so as to efficiently obtain a thrust, while preventing the solid propellant 201 sublimated into high-pressure gas from spreading over surroundings and attaching on surrounding devices/structures as a re-solidified substance causing contamination thereof. Preferably, the main-discharge electrode 231a and the main-discharge electrode 231b included in the nozzle 231 are composed of a pair of rod-shaped electrodes disposed in opposed relation to one another in a divergent arrangement where a distance therebetween gradually increases in a downstream direction of the propulsive jet 208. Preferably, the nozzle 231 has two side walls formed in the same configuration and disposed to sandwich the opposed main-discharge electrodes 231a, 231b therebetween so as to define a divergent inner space in the nozzle 231. The nozzle 231 formed in a divergent rectangular parallelepiped shape makes it possible to define a linear space between the main-discharge electrodes 231a, 231b so as to allow the main-discharge electrodes 231a, 231b to stably generate a main discharge therebetween, and to expel the propulsive jet 208 in the downstream direction through the divergent inner space at a maximized speed and in a concentrated manner. The main-discharge electrodes 231a, 431b are provided as means for sublimating and ionized the solid propellant 201 to produce a plasma, based on a high-voltage electric power supplied therebetween from a main-discharge power supply (not shown), so as to electromagnetically accelerate the plasma.

The igniter 231c is provided as an igniter plug including a triggering-discharge electrode adapted to generate a triggering discharge for initiating a main discharge, based on an electric power supplied thereto from a triggering-discharge power supply (not shown). The igniter 231c has a body penetratingly embedded in either one of the main-discharge electrodes 231a, 231b (main-discharge electrodes 231c in this embodiment) in such a manner as to allow the triggering-discharge electrode to be exposed to the inner space of the nozzle 231. The igniter 231c has one or two triggering-discharge electrodes. When the igniter 231c has one triggering-discharge electrode, a triggering discharge is generated between this triggering-discharge electrode and the main-discharge electrodes 231c. When the igniter 231c has two triggering-discharge electrodes, a triggering discharge is generated between these triggering-discharge electrodes. The controller 212 is operable to control the timing at which the triggering-discharge power supply allows the igniter 231c to generate a triggering discharge.

An operation of the solid propellant-based space propulsion device 200 will be described below. While the operation of the solid propellant-based space propulsion device 200 is partly the same as that of the solid propellant-based space propulsion device 100 according to the first embodiment, the mechanism and operation for releasing/expelling the solid propellant 201 are different from those in the solid propellant-based space propulsion device 100, as follows.

As with the first embodiment, the solid propellant 201 is attached on a surface of the solid-propellant attachment drum 203 by the adherence-inducing laser beam 206A emitted from the adherence-inducing laser beam oscillator 205A. The solid propellant 201 adherently held on the solid-propellant attachment drum 203 is transferred to a release position 211 by the action of the solid-propellant-attachment-drum rotating motor 204 controlled by the controller 212. The main-discharge power supply (not shown) applies a high voltage between the main-discharge electrode 231a and the main-discharge electrode 231b. A main discharge is to be instantaneously generated between the main-discharge electrodes 231a, 231b. Thus, the main-discharge power supply is preferably composed of a device capable of instantaneously supplying a large current, for example, a charged capacitor. At the timing of initiating a main discharge between the main-discharge electrodes 231a, 231b, a small triggering discharge is generated using the triggering-discharge electrode of the igniter 231c under control of the controller 212. Through the triggering discharge, a plasma consisting of ions and electrons is produced around the triggering-discharge electrode. The plasma is accelerated by an electric field between the main-discharge electrodes 231a, 231b, and collided molecules are further ionized to induce a main discharge.

The solid propellant 201 in the vicinity of the release position 211 is sublimated by heat generated through the main discharge, and the sublimated solid propellant 201 is ionized to produce a plasma, through a collision with ions and electrons from a current of the main discharge and heat generated by the current of the main discharge, and the produced plasma further facilitates flow of the current of the main discharge. In this manner, a pulsed main discharge is generated.

The main discharge current flowing between the main-discharge electrodes 231a, 231b generates a self-induced magnetic field around the main discharge current in an annular pattern. The main discharge current flows across the plasma, and the plasma is electromagnetically accelerated in the downstream direction by an interaction between the plasma current and the self-induced magnetic field. The accelerated plasma is guided by the nozzle 231 and expelled toward the downstream side in an opening direction of the nozzle 231 as the propulsive jet 208 to produce a thrust as a counteraction against the propulsive jet 208. This plasma acceleration mechanism is the same as an acceleration mechanism of a pulsed plasma thruster (PPT), and referred to herein as "PPT electromagnetic acceleration". Subsequently, in the same manner as that in the solid propellant-based space propulsion device 100 according to the first embodiment, the controller 212 performs a control for returning a area for adherently holding the solid propellant 201 (solid-propellant holding area) in the solid-propellant attachment drum 203 to an attachment position 210 in a repetitive manner.

Third Embodiment

Discharge Heating

Figure 3:
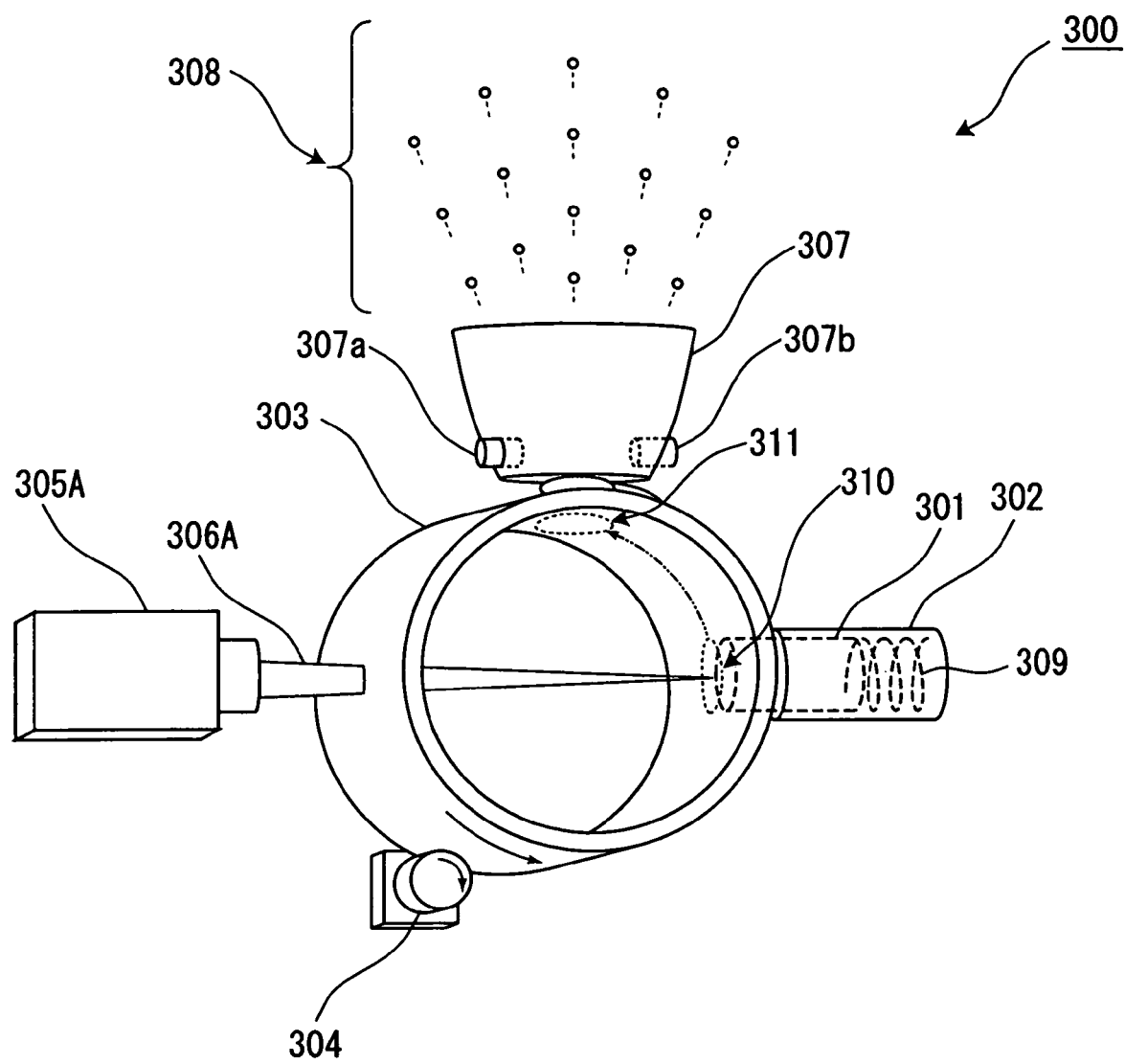
FIG. 3 is a schematic perspective view showing the structure of a solid propellant-based space propulsion device 300 according to a third embodiment of the present invention.

A third embodiment of the present invention will be described below. FIG. 3 is a schematic perspective view showing the structure of a solid propellant-based space propulsion device 300 according to the third embodiment of the present invention. In the solid propellant-based space propulsion device 300, a solid propellant is released by means of discharge heating.

The structure of the solid propellant-based space propulsion device 300 will be firstly described. In FIG. 3, a component equivalent to that in other embodiments is defined by a reference numeral having the common tens and ones digits. The solid propellant-based space propulsion device 300 comprises a solid-propellant support case 302, a solid-propellant attachment drum 303, a solid-propellant-attachment-drum rotating motor 304, an adhesion-inducing laser beam oscillator 305A, a nozzle 307 and a solid-propellant feed spring 309. The nozzle 331 includes a main-discharge electrode 307a and a main-discharge electrode 307b. The solid propellant-based space propulsion device 300 includes a housing (not shown) containing the above components while adequately maintaining a positional relationship therebetween. The solid propellant-based space propulsion device 300 further includes a controller (not shown) 312 for controlling respective operations of the solid-propellant-attachment-drum rotating motor 304, the adhesion-inducing laser beam oscillator 305A, the main-discharge electrode 307a and the main-discharge electrode 307b in association with each other. The solid propellant-based space propulsion device 300 is different from the solid propellant-based space propulsion device 200 according to the second embodiment, in that the solid propellant-based space propulsion device 300 includes the nozzle 307 without using a component equivalent to the nozzle 231 in the second embodiment.

As with the solid propellant 101 in the first embodiment, a solid propellant 301 is made of a material which is sublimatable by heating, and can produce a thrust for the solid propellant-based space propulsion device 300 when it is released/expelled from the space propulsion device 300. More specifically, the solid propellant 301 is made of a material which is heatingly molten or sublimated by energy (adhesion energy) less than propulsive-energy required for releasing/expelling the solid propellant 301. Thus, the adhesion energy can be given to the solid propellant 301 to allow the solid propellant 301 to be attached onto and adherently held on the solid-propellant attachment drum 303.

Each of the solid-propellant support case 302, the solid-propellant attachment drum 303, the solid-propellant-attachment-drum rotating motor 304, the adhesion-inducing laser beam oscillator 305A, the solid-propellant feed spring 309 and the controller 312 has the same structure as the corresponding component in the second embodiment, except that the controller 312 is electrically connected to a main-discharge power supply of the main-discharge electrodes 307a, 307b.

The nozzle 307 is provided as one specific example of a combination of propulsive-energy supply means for supplying propulsive energy to the solid propellant 301, and a jet member for guiding a sublimated solid propellant 301 to the outside as a propulsive jet 308. Specifically, the nozzle 307 serving as the jet member is operable to adequately control a direction and speed of the propulsive jet 308 so as to efficiently obtain a thrust, while preventing the solid propellant 301 sublimated into high-pressure gas from spreading over surroundings and attaching on surrounding devices/structures as a re-solidified substance causing contamination thereof. Preferably, the main-discharge electrode 307a and the main-discharge electrode 307b included in the nozzle 307 are disposed in such a manner that a gap therebetween is located immediately above a release position 311 on the solid-propellant attachment drum 303. This arrangement allows the solid propellant 301 on the solid-propellant attachment drum 303 to be efficiently heated by energy of a main discharge generated between the main-discharge electrodes 307a, 307b. The main-discharge electrodes 307a, 307b are provided as means for sublimating the solid propellant 301 based on a high-voltage electric power supplied therebetween from a main-discharge power supply (not shown).

An operation of the solid propellant-based space propulsion device 300 will be described below. While the operation of the solid propellant-based space propulsion device 300 is partly the same as that of the solid propellant-based space propulsion device 200 according to the second embodiment, the mechanism and operation for releasing/expelling the solid propellant 301 are different from those in the solid propellant-based space propulsion device 200, as follows.

As with the first embodiment, the solid propellant 301 is attached on a surface of the solid-propellant attachment drum 303 by the adherence-inducing laser beam 306A emitted from the adherence-inducing laser beam oscillator 305A. The solid propellant 301 adherently held on the solid-propellant attachment drum 303 is transferred to a release position 311 by the action of the solid-propellant-attachment-drum rotating motor 304 controlled by the controller 312. At the timing of initiating a main discharge between the main-discharge electrodes 307a, 307b, the main-discharge power supply applies an extra-high voltage therebetween according to control of the controller 312. This main discharge is instantaneously generated. Thus, the main-discharge power supply is preferably composed of a device capable of instantaneously supplying a large current, for example, a charged capacitor and an extra-high voltage induction coil connected to the capacitor. In response to an extra-high voltage supplied from the main-discharge power supply, an instantaneous discharge is generated between the main-discharge electrodes 307a, 307b to heat the solid propellant 301. Preferably, the solid propellant 301 is disposed at a position where it is interposed in a discharge path, so as to allow a discharge current to flow directly through the solid propellant 301 and heat the solid propellant 301. The heated solid propellant 301 is sublimated into a high-temperature/high-pressure gas. The high-pressure gas is guided by the nozzle 307 and expelled toward the downstream side in an opening direction of the nozzle 307 as the propulsive jet 308 to produce a thrust as a counteraction against the propulsive jet 308. Subsequently, in the same manner as that in the solid propellant-based space propulsion device 100 according to the first embodiment, the controller 312 performs a control for returning a area for adherently holding the solid propellant 301 (solid-propellant holding area) in the solid-propellant attachment drum 303 to an attachment position 310 in a repetitive manner.

A component equivalent to the igniter 231c in the second embodiment may be disposed between the main-discharge electrodes 307a, 307b. In this case, a certain level of high voltage is applied between the main-discharge electrodes 307a, 307b in advance. Then, the igniter 331c generates a small triggering discharge using a triggering-discharge electrode thereof. This triggering discharge induces a main discharge between the main-discharge electrodes 307a, 307b to transform the solid propellant 301 into a high-pressure gas (one example of modification using an igniter).

Fourth Embodiment

Laser Heating & Switching between Plural Laser Devices

Figure 4:
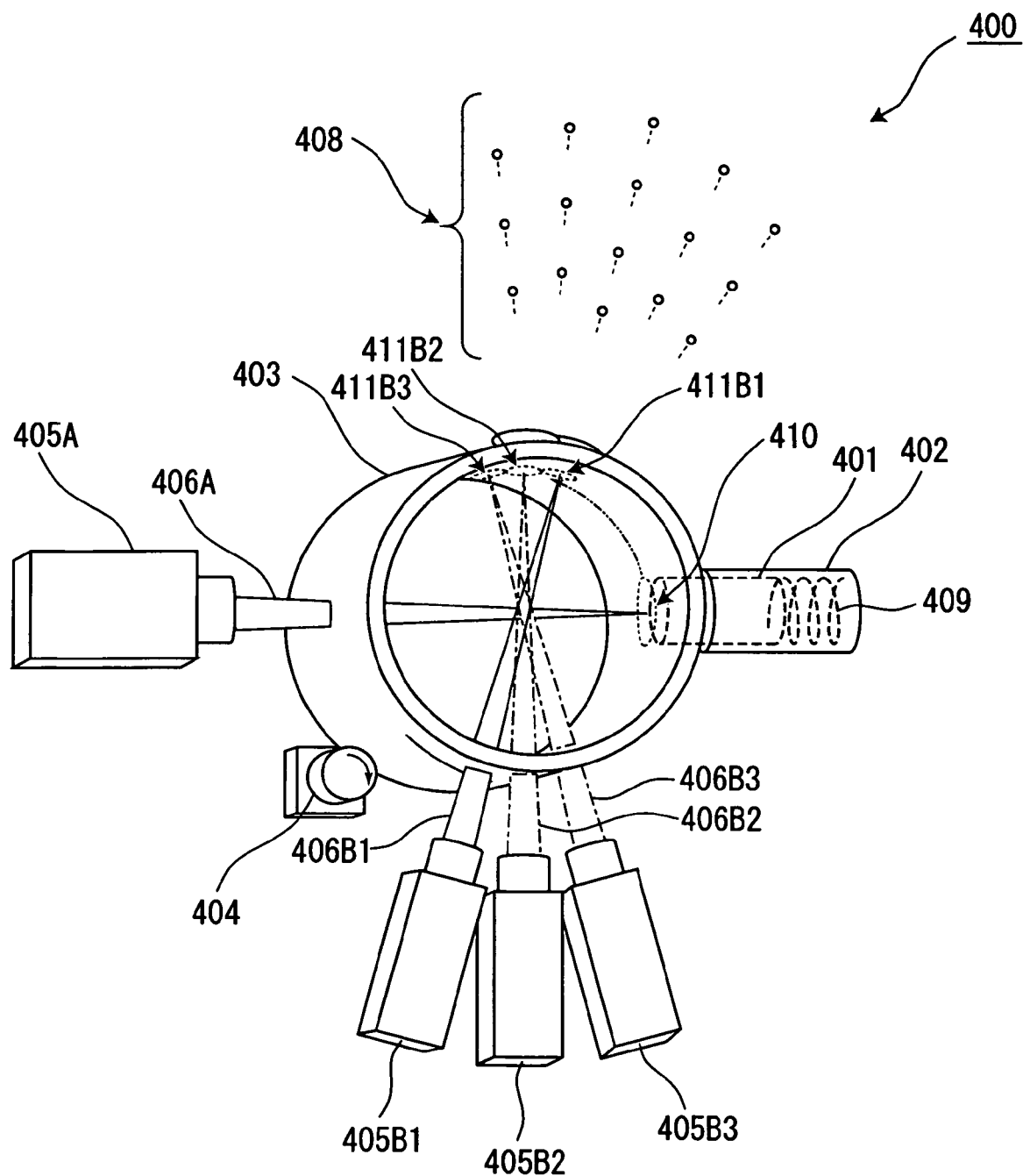
FIG. 4 is a schematic perspective view showing the structure of a solid propellant-based space propulsion device 400 according to a fourth embodiment of the present invention.

A fourth embodiment of the present invention will be described below. FIG. 4 is a schematic perspective view showing the structure of a solid propellant-based space propulsion device 400 according to the fourth embodiment of the present invention. In the solid propellant-based space propulsion device 400, a solid propellant is released by means of laser heating, and a plurality of laser beam oscillators are used in a switchable manner to change a direction of a propulsive jet. The structure of the solid propellant-based space propulsion device 400 will be firstly described. In FIG. 4, a component equivalent to that in other embodiments is defined by a reference numeral having the common tens and ones digits. The solid propellant-based space propulsion device 400 comprises a solid-propellant support case 402, a solid-propellant attachment drum 403, a solid-propellant-attachment-drum rotating motor 404, an adhesion-inducing laser beam oscillator 405A, a release-inducing laser beam oscillator 405B1, a release-inducing laser beam oscillator 405B2, a release-inducing laser beam oscillator 405B3 and a solid-propellant feed spring 409. The solid propellant-based space propulsion device 400 includes a housing (not shown) containing the above components while adequately maintaining a positional relationship therebetween. The solid propellant-based space propulsion device 400 further includes a controller (not shown) 412 for controlling respective operations of the solid-propellant-attachment-drum rotating motor 404, the adhesion-inducing laser beam oscillator 405A, the release-inducing laser beam oscillator 405B1, the release-inducing laser beam oscillator 405B2 and the release-inducing laser beam oscillator 405B3 in association with each other. The solid propellant-based space propulsion device 400 is different from the solid propellant-based space propulsion device 100 according to the first embodiment, in that the solid propellant-based space propulsion device 400 includes the plurality of release-inducing laser beam oscillators without using a component equivalent to the nozzle 107 in the first embodiment. In the solid propellant-based space propulsion device 400, a solid propellant 401 is used as a propellant.

As with the solid propellant 101 in the first embodiment, the solid propellant 401 is made of a material which is sublimatable by heating, and can produce a thrust for the solid propellant-based space propulsion device 400 when it is released/expelled from the space propulsion device 400. More specifically, the solid propellant 401 is made of a material which is heatingly molten or sublimated by energy (adhesion energy) less than propulsive-energy required for releasing/expelling the solid propellant 401. Thus, the adhesion energy can be given to the solid propellant 401 to allow the solid propellant 401 to be attached onto and adherently held on the solid-propellant attachment drum 403.

Each of the solid-propellant support case 402, the solid-propellant attachment drum 403, the solid-propellant-attachment-drum rotating motor 404, the adhesion-inducing laser beam oscillator 405A, the solid-propellant feed spring 409 and the controller 412 has the same structure as the corresponding component in the second embodiment, except that the controller 412 is electrically connected to each of the release-inducing laser beam oscillator 405B1, the release-inducing laser beam oscillator 405B2 and the release-inducing laser beam oscillator 405B3 to switch between these release-inducing laser beam oscillators depending on an intended thrust direction.

Each of the release-inducing laser beam oscillators 405B1, 405B2, 405B3 has the same structure as that of the release-inducing laser beam oscillator 105B in the first embodiment. The release-inducing laser beam oscillators 405B1, 405B2, 405B3 are disposed in such a manner as to irradiate, respectively, a plurality (three in this embodiment) of different release positions 411B1, 411B2, 411B3 on the solid-propellant attachment drum 403 with release-inducing laser beams 406B1, 406B2, 406B3 from behind or a rear surface of the solid-propellant attachment drum 403 through the solid-propellant attachment drum 403. While three of the release-inducing laser beam oscillators are used in this embodiment, the number of the release-inducing laser beam oscillators may be arbitrarily selected. A component equivalent to the nozzle 107 in the solid propellant-based space propulsion device 100 according to the first embodiment is not essential to the solid propellant-based space propulsion device 400. When the nozzle is omitted in the solid propellant-based space propulsion device 800, an interval between the release positions 411B1, 411B2, 411B3 can be increased to allow the propulsive-jet direction or thrust direction to be largely changed. It is understood that a nozzle (not shown) 432 may be disposed in the same manner as the nozzle 107 in the solid propellant-based space propulsion device 100 according to the first embodiment. In this case, the nozzle 432 has an upstream open end disposed adjacent to the release positions 411B1, 411B2, 411B3 in such a manner as to surround all of the release positions 411B1, 411B2, 411B3. Preferably, the upstream open end of the nozzle 432 is formed in an elongated shape or an oval shape along the release positions 411B1, 411B2, 411B3, instead of a circular shape. Further, the nozzle 432 is preferably formed to have an elongated or oval shape in section. The nozzle 432 is designed to prevent a sublimated solid propellant 401 from spreading over surroundings and attaching on surrounding devices/structures as a re-solidified substance causing contamination thereof, and to adequately control a direction and speed of the propulsive jet 408 so as to efficiently obtain a thrust.

An operation of the solid propellant-based space propulsion device 400 will be described below. While the operation of the solid propellant-based space propulsion device 400 is partly the same as that of the solid propellant-based space propulsion device 100 according to the first embodiment, the mechanism and operation for releasing the solid propellant 401 are different from those in the solid propellant-based space propulsion device 100, as follows.

As with the first embodiment, the solid propellant 401 is attached on a surface of the solid-propellant attachment drum 403 by an adherence-inducing laser beam 406A emitted from the adherence-inducing laser beam oscillator 405A. Under control of the controller 412, the solid propellant 401 adherently held on the solid-propellant attachment drum 403 is transferred by the action of the solid-propellant-attachment-drum rotating motor 404, to either one of the release positions 411B1, 411B2, 411B3 depending on a desired expelling direction of the propulsive jet 408. The following description will be made on the assumption that the release positions 411B1 corresponds to a desired expelling direction of the propulsive jet 408.

The controller 412 detects that the solid propellant 401 has been transferred to the release position 411B1 corresponding to the desired propulsive-jet expelling direction, based on an output of a sensor or the number of rotations of the solid-propellant-attachment-drum rotating motor 404, and instructs the release-inducing laser beam oscillator 405B1 to oscillate and emit the release-inducing laser beam 406B1 so as to allow a area for adherently holding the solid propellant 401 (solid-propellant holding area) of the solid-propellant attachment drum 403 transferred to the release position 411B1 to be irradiated with the release-inducing laser beam 406B1 from behind or the rear surface of the solid-propellant attachment drum 403 through the solid-propellant attachment drum 403. In the case where the solid propellant 401 is serially transferred, the release-inducing laser beam 406B1 is serially emitted in synchronization therewith. The solid propellant 401 irradiated with the release-inducing laser beam 406B1 absorbs energy of the release-inducing laser beam 406B1. Thus, the solid propellant 401 is heated and sublimated into a high-temperature/high-pressure gas. The resulting high-pressure gas receives the same pressure as that of itself perpendicular to and from the surface of the solid-propellant attachment drum 403 at the release position 411B. Thus, the high-pressure gas is accelerated in the direction from which the pressure is received. Then, the accelerated high-pressure gas is guided by the nozzle 432 and expelled downward in the desired expelling direction or with a given angular range in an opening direction of the nozzle 432 as the propulsive jet 408 so as to produce a thrust as a counteraction against the propulsive jet 408. Depending on a desired expelling direction, the controller 412 continuously performs an operation of activating either one of the release-inducing laser beam oscillators 405B1, 405B2, 405B3 to heat the solid propellant 401 located at a corresponding one of the release positions 411B1, 411B2, 411B3 so as to release and expel the propulsive jet 408 in the desired expelling direction. Subsequently, in the same manner as that in the solid propellant-based space propulsion device 100 according to the first embodiment, the controller 412 performs controls for returning the solid-propellant holding area of the solid-propellant attachment drum 403 to an attachment position 410 in a repetitive manner.

Fifth Embodiment

Laser Heating & Variable Laser Beam Emitting Direction

Figure 5:
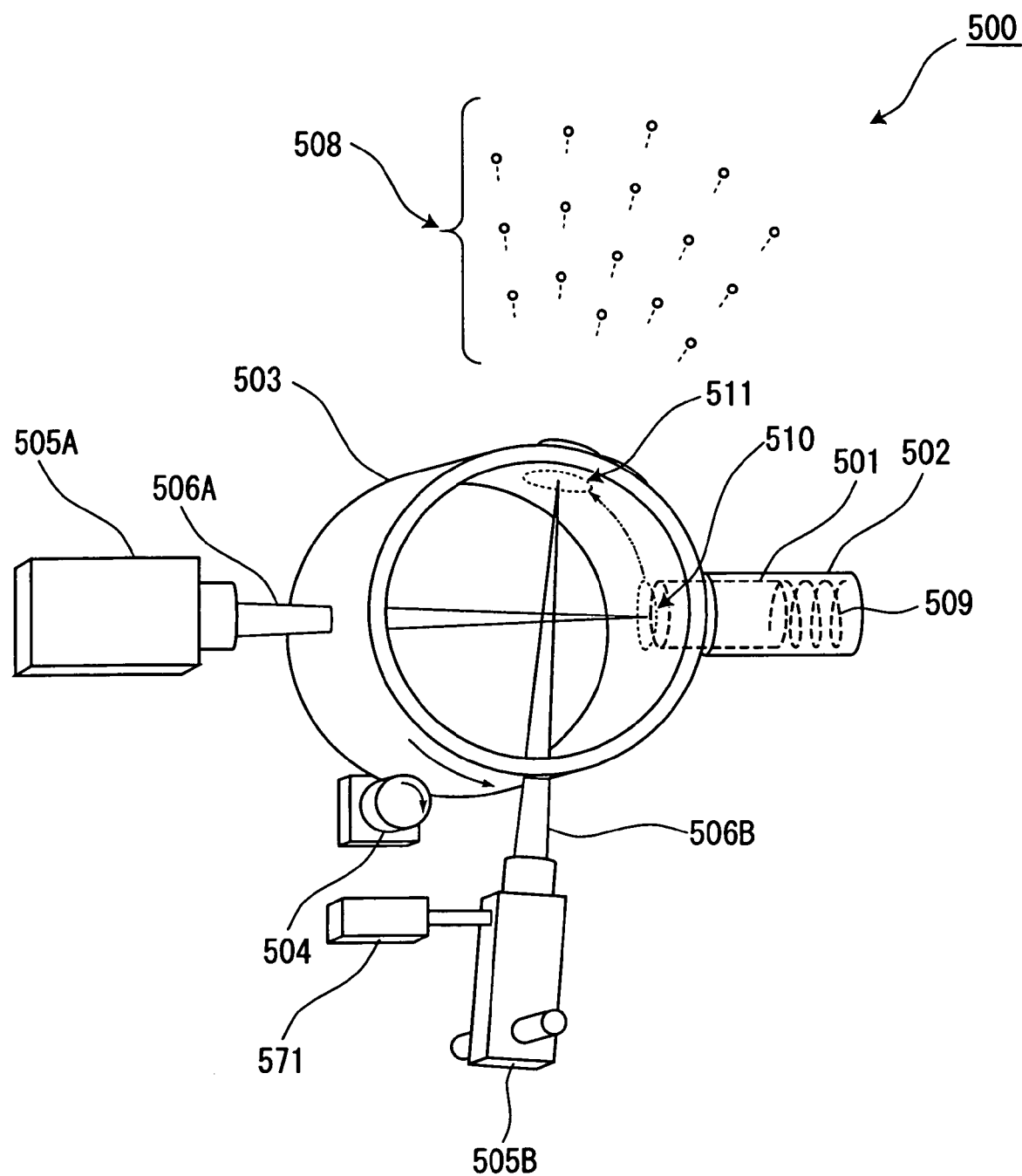
FIG. 5 is a schematic perspective view showing the structure of a solid propellant-based space propulsion device 500 according to a fifth embodiment of the present invention.

A fifth embodiment of the present invention will be described below. FIG. 5 is a schematic perspective view showing the structure of a solid propellant-based space propulsion device 500 according to the fifth embodiment of the present invention. In the solid propellant-based space propulsion device 500, a solid propellant is released by means of laser heating, and an emitting direction of a laser beam generated by a laser beam oscillator is varied to change a direction of a propulsive jet. The structure of the solid propellant-based space propulsion device 500 will be firstly described. In FIG. 5, a component equivalent to that in other embodiments is defined by a reference numeral having the common tens and ones digits. The solid propellant-based space propulsion device 500 comprises a solid-propellant support case 502, a solid-propellant attachment drum 503, a solid-propellant-attachment-drum rotating motor 504, an adherence-inducing laser beam oscillator 505A, a release-inducing laser beam oscillator 505B, a solid-propellant feed spring 509 and a release-inducing-laser-beam-oscillator actuator 571. The solid propellant-based space propulsion device 500 includes a housing (not shown) containing the above components while adequately maintaining a positional relationship therebetween. The solid propellant-based space propulsion device 500 further includes a controller (not shown) 512 for controlling respective operations of the solid-propellant-attachment-drum rotating motor 504, the adherence-inducing laser beam oscillator 505A, the release-inducing laser beam oscillator 505B and the release-inducing-laser-beam-oscillator actuator 571 in association with each other. The solid propellant-based space propulsion device 500 is different from the solid propellant-based space propulsion device 100 according to the first embodiment, in that the solid propellant-based space propulsion device 500 includes the release-inducing-laser-beam-oscillator actuator 571 without using a component equivalent to the nozzle 107 in the first embodiment. In the solid propellant-based space propulsion device 500, a solid propellant 501 is used as a propellant.

As with the solid propellant 101 in the first embodiment, the solid propellant 501 is made of a material which is sublimatable by heating, and can produce a thrust for the solid propellant-based space propulsion device 500 when it is released/expelled from the space propulsion device 500. More specifically, the solid propellant 501 is made of a material which is heatingly molten or sublimated by energy (adhesion energy) less than propulsive-energy required for releasing/expelling the solid propellant 501. Thus, the adhesion energy can be given to the solid propellant 501 to allow the solid propellant 501 to be attached onto and adherently held on the solid-propellant attachment drum 503.

Each of the solid-propellant support case 502, the solid-propellant attachment drum 503, the solid-propellant-attachment-drum rotating motor 504, the adhesion-inducing laser beam oscillator 505A, the solid-propellant feed spring 509 and the controller 512 has the same structure as the corresponding component in the second embodiment, except that the controller 512 is additionally connected to the release-inducing-laser-beam-oscillator actuator 571.

The release-inducing-laser-beam-oscillator actuator 571 is provided as one example of means for variably changing a laser-beam emitting direction. Preferably, the release-inducing-laser-beam-oscillator actuator 571 has a movable element composed of a linear actuator or a rotary actuator. The controller 512 is operable, based on a desired propulsive-jet expelling direction, to determine a displacement value of the movable element of the release-inducing-laser-beam-oscillator actuator 571 and controllably move the movable element of the release-inducing-laser-beam-oscillator actuator 571 by the determined displacement value. Through this control, the release-inducing-laser-beam-oscillator actuator 571 changes a posture of the release-inducing laser beam oscillator 505B to vary the emitting direction of a release-inducing laser beam 506B. The emitting direction of the release-inducing laser beam 506B is varied depending on a desired expelling direction.

A component equivalent to the nozzle 107 in the solid propellant-based space propulsion device 100 according to the first embodiment is not essential to the solid propellant-based space propulsion device 500. When the nozzle is omitted in the solid propellant-based space propulsion device 500, a variable range of a release position 511 can be increased to allow a propulsive-jet direction or thrust direction to be largely changed. It is understood that a nozzle (not shown) 532 may be disposed in the same manner as the nozzle 107 in the solid propellant-based space propulsion device 100 according to the first embodiment. In this case, the nozzle 532 has an upstream open end disposed adjacent to the release position 511 in such a manner as to surround the entire variable range of the release position 511. Preferably, the upstream open end of the nozzle 532 is formed in an elongated shape or an oval shape along the variable range of the release position 511, instead of a circular shape. Further, the nozzle 532 is preferably formed to have an elongated or oval shape in section. The nozzle 532 is designed to prevent a sublimated solid propellant 501 from spreading over surroundings and attaching on surrounding devices/structures as a re-solidified substance causing contamination thereof, and to adequately control a direction and speed of the propulsive jet 508 so as to efficiently obtain a thrust.

An operation of the solid propellant-based space propulsion device 500 will be described below. While the operation of the solid propellant-based space propulsion device 500 is partly the same as that of the solid propellant-based space propulsion device 100 according to the first embodiment, the mechanism and operation for releasing the solid propellant 501 are different from those in the solid propellant-based space propulsion device 100, as follows.

As with the first embodiment, the solid propellant 501 is attached on a surface of the solid-propellant attachment drum 503 by an adherence-inducing laser beam 506A emitted from the adherence-inducing laser beam oscillator 505A. Under control of the controller 512, the solid propellant 501 adherently held on the solid-propellant attachment drum 503 is transferred by the action of the solid-propellant-attachment-drum rotating motor 504, to the release position 511 which corresponds to a laser-beam emitting direction of the release-inducing laser beam oscillator 505B which is changed in posture by the release-inducing-laser-beam-oscillator actuator 571 in accordance with a desired propulsive-jet expelling direction.

The controller 512 detects that the solid propellant 501 has been transferred to the release position 511 based on an output of a sensor or the number of rotations of the solid-propellant-attachment-drum rotating motor 504, and instructs the release-inducing laser beam oscillator 505B to oscillate and emit the release-inducing laser beam 506B so as to allow a area for adherently holding the solid propellant 501 (solid-propellant holding area) of the solid-propellant attachment drum 503 transferred to the release position 511 to be irradiated with the release-inducing laser beam 506B from behind or the rear surface of the solid-propellant attachment drum 503 through the solid-propellant attachment drum 503. In the case where the solid propellant 501 is serially transferred, the release-inducing laser beam 506B is serially emitted in synchronization therewith. The solid propellant 501 irradiated with the release-inducing laser beam 506B absorbs energy of the release-inducing laser beam 506B. Thus, the solid propellant 501 is heated and sublimated into a high-temperature/high-pressure gas. The resulting high-pressure gas receives the same pressure as that of itself perpendicular to and from the surface of the solid-propellant attachment drum 503 at the release position 511. Thus, the high-pressure gas is accelerated in the direction from which the pressure is received. Then, the accelerated high-pressure gas is guided by the nozzle 532 and expelled downward in the desired expelling direction or with a given angular range in an opening direction of the nozzle 532 as the propulsive jet 508 so as to produce a thrust as a counteraction against the propulsive jet 508. Depending on a desired expelling direction, the controller 512 continuously performs an operation of activating the release-inducing-laser-beam-oscillator actuator 571 to change the posture of the release-inducing laser beam oscillator 505B so as to release and expel the propulsive jet 508 in the desired expelling direction. Subsequently, in the same manner as that in the solid propellant-based space propulsion device 100 according to the first embodiment, the controller 512 performs controls for returning the solid-propellant holding area of the solid-propellant attachment drum 503 to an attachment position 510 in a repetitive manner.

Various embodiments of the present invention have been described. These embodiments include various types of structural/functional elements as shown in the following summary. In the solid propellant-based space propulsion device of the present invention, any of these structural/functional elements may be combined together to the extent possible, as follows.

I. Chemical Characteristics of Solid Propellant
(1) Material which is sublimatable by heating (sublimatable material)
(2) Material which is sublimatable by heating and ionizable by discharge (sublimatable/ionizable material)
The "sublimatable material" may be used in the following III-(1) "laser heating", and III-(2) "discharge heating".
The "sublimatable/ionizable material" may be used in the following III-(3) "PPT electromagnetic acceleration".

II. Shape of Solid-Propellant Attachment Drum
(1) Cylindrical shape
(2) Partially cylindrical shape
(3) Planar shape
Either one of these shapes may be freely selected.

III. Means for Accelerating Solid Propellant
(1) Laser heating
(2) Discharge heating
(3) PPT electromagnetic acceleration
These means may be used based on the relation set forth in the Section I.

VI. Propulsion-Jet Expelling Direction in Laser Heating
(1) Single expelling direction using single release-inducing laser beam oscillator
(2) Variable expelling direction based on switching between plural release-inducing laser beam oscillators
(3) Variable expelling direction based on single release-inducing laser beam oscillator with variable emitting direction function
Either one of the means may be freely selected.

What is claimed is:

1. A solid propellant-based space propulsion device comprising:
solid-propellant support means for supporting a solid propellant;
a solid-propellant attachment surface for permitting said solid propellant supported by said solid-propellant support means to be attached thereon on a portion-by-portion basis from the side of an end of said solid propellant;
solid-propellant feed means for moving the solid propellant supported by said solid-propellant support means toward said solid-propellant attachment surface to feed said solid propellant to an attachment position for attaching the solid-propellant onto said solid-propellant attachment surface;
adhesion-energy supply means for heatingly melting or sublimating a portion of the solid propellant fed to be in contact with or adjacent to said attachment position on said solid-propellant attachment surface, so as to adherently attach the portion of said solid propellant onto said solid-propellant attachment surface;
solid-propellant transfer means for moving said solid-propellant attachment surface having a area for adherently holding the solid propellant thereon, to transfer said solid propellant adherently held on said area to a release position for releasing said solid propellant; and
propulsive-energy supply means for energizing the solid propellant transferred to said release position to release said solid propellant from said solid-propellant attachment surface, toward a downstream side thereof as a propulsive jet, while accelerating the solid propellant in a direction approximately perpendicular to said solid-propellant attachment surface at said release position,
wherein said solid-propellant transfer means is designed to move said solid-propellant attachment surface in such a manner that said area for adherently holding the solid propellant is returned to a position adjacent to the end of said solid propellant in a repetitive manner.

2. The solid propellant-based space propulsion device as defined in claim 1, which further comprises a tube-shaped jet member having an upstream end for introducing the propulsive jet generated at said release position and a downstream end for expelling the introduced propulsive jet, said upstream end of said jet member being disposed adjacent to said solid-propellant attachment surface, wherein said release position is defined within a area of said solid-propellant attachment surface surrounded by said upstream end of said jet member.

3. The solid propellant-based space propulsion device as defined in claim 2, wherein said jet member is formed as a divergent nozzle.

4. The solid propellant-based space propulsion device as defined in claim 1, wherein:
said solid propellant is formed in a rod shape; and
said solid-propellant feed means is operable to linearly move said solid propellant toward said solid-propellant attachment surface so as to feed said solid propellant forward.

5. The solid propellant-based space propulsion device as defined in claim 4, wherein said solid-propellant feed means comprises a spring adapted to bias said solid propellant toward said solid-propellant attachment surface so as to feed said solid propellant forward.

6. The solid propellant-based space propulsion device as defined in claim 1, wherein:
at least a part of said solid-propellant attachment surface is formed as a transparent portion made of a transparent material; and
said adhesion-energy supply means is composed of a laser beam oscillator, said laser beam oscillator being designed to generate a laser beam and irradiate the solid propellant located in said attachment position, with the laser beam from behind said solid-propellant attachment surface through said transparent portion to heatingly melt or sublimate said solid propellant so as to adherently attach said solid propellant onto said solid-propellant attachment surface.

7. The solid propellant-based space propulsion device as defined in claim 1, wherein:
said solid propellant is made of a material which is sublimatable by heating;
at least a part of said solid-propellant attachment surface is formed as a transparent portion made of a transparent material; and
said propulsive-energy supply means is composed of a laser beam oscillator, said laser beam oscillator being designed to generate a laser beam and irradiate the solid propellant transferred to said release position, with the laser beam from behind said solid-propellant attachment surface through said transparent portion to heatingly sublimate and release said solid propellant.

\* \* \* \* \*